United States Patent
Dillon et al.

(10) Patent No.: US 6,192,247 B1
(45) Date of Patent: Feb. 20, 2001

(54) METHOD FOR EXTENDING THE CELL RADIUS BETWEEN A MOBILE STATION AND A BASE STATION

(75) Inventors: Matthew James Dillon, Palatine; Bogdan Romulus Nedelcu, Algonquin, both of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/344,770

(22) Filed: Jun. 28, 1999

(51) Int. Cl.⁷ .................................................. H04Q 7/20
(52) U.S. Cl. ......................... 455/446; 455/67.4; 455/453
(58) Field of Search .................................. 455/423, 403, 455/424, 425, 446, 449, 453, 456, 501–503, 507, 561, 67.4, 524, 436; 370/252, 337, 347, 350

(56) References Cited

U.S. PATENT DOCUMENTS

| | | | |
|---|---|---|---|
| 4,850,032 | * 7/1989 | Freeburg | 455/503 |
| 5,471,649 | * 11/1995 | Rees et al. | 455/67.4 |
| 5,485,632 | * 1/1996 | Ng et al. | 455/503 |
| 5,625,627 | * 4/1997 | Ishi | 370/347 |
| 5,678,193 | * 10/1997 | Helm et al. | 455/503 |
| 5,831,974 | * 11/1998 | Suonvieri | 370/252 |
| 6,061,565 | * 5/2000 | Innes et al. | 455/436 |

* cited by examiner

Primary Examiner—William G. Trost
Assistant Examiner—Charles Craver
(74) Attorney, Agent, or Firm—John B. Macintyre; Kenneth A. Haas

(57) ABSTRACT

The present invention provides a method for extending the cell radius between a mobile station (101) and a base station (103). A propagation delay is determined between the mobile station (101) and the base station (103). A transmit time offset is determined for the mobile station (101). The transmit time offset is based at least in part upon the propagation delay. Information is then transmitted between the mobile station (101) and the base station (103) at the transmit time offset.

6 Claims, 4 Drawing Sheets

METHOD FOR EXTENDING THE CELL RADIUS BETWEEN A MOBILE STATION AND A BASE STATION

FIELD OF THE INVENTION

The invention relates generally to communication systems, and more particularly to a method for extending the cell radius between a mobile station and a base station.

BACKGROUND OF THE INVENTION

In current cellular communication systems, a mobile station communicates with a base station. The mobile station must be located within a predetermined distance from the base station. In IS-95 cellular systems, an implementation limitation of 55 kilometers has been set. Consequently, a mobile station must be within 55 kilometers in order to communicate with a base station.

When a mobile station is distant from its serving base station, the propagation delay can become significant. If the power at the mobile station is sufficient to reach the base station, the limitation comes from the ability of the base station to find the signal transmitted by the mobile station from the distant location. In IS-95 systems, a base station typically searches for energy within an interval of +/−226 PN chips, which translates to about 0.184 ms. This corresponds to a distance of about 55.176 km. Beyond this distance, the searcher can not see the mobile station's transmitted signal.

However, when the mobile station has enough power to reach the base station, the inability to communicate is caused by the inability of the base station to find the signal within a predetermined search window. Thus, a need exists for a method for extending the cell radius between a mobile station and a base station.

DETAILED DESCRIPTION OF A PREFERRED EMBODIMENT

The present invention provides a method for extending the cell radius between a mobile station and a base station. The propagation delay between the mobile station and the base station is determined. A transmit time offset for the mobile station is determined. The transmit time offset is preferably based at least in part upon the propagation delay. Information is then transmitted between the mobile station and the base station at the transmit time offset.

The present invention solves the problems associated with the prior art by having the mobile station advance the transmission of its signal. In so doing, the signal transmitted by the mobile station will arrive at the base station within 0.184 ms, thereby making it visible to the searcher at the base station.

Figure 1:
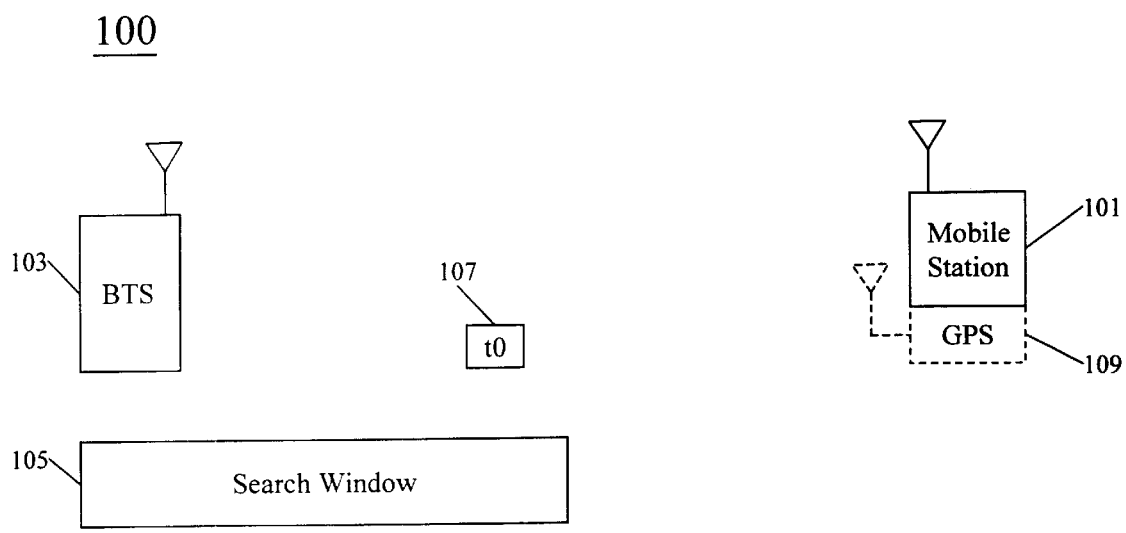
FIG. 1 depicts a communication system including a base transceiver station and a mobile station in accordance with the present invention.

The present invention can be better understood with reference to FIGS. 1–4. Referring now to FIG. 1, a communication system 100 in accordance with the preferred embodiment of the present invention is depicted.

Figure 2:
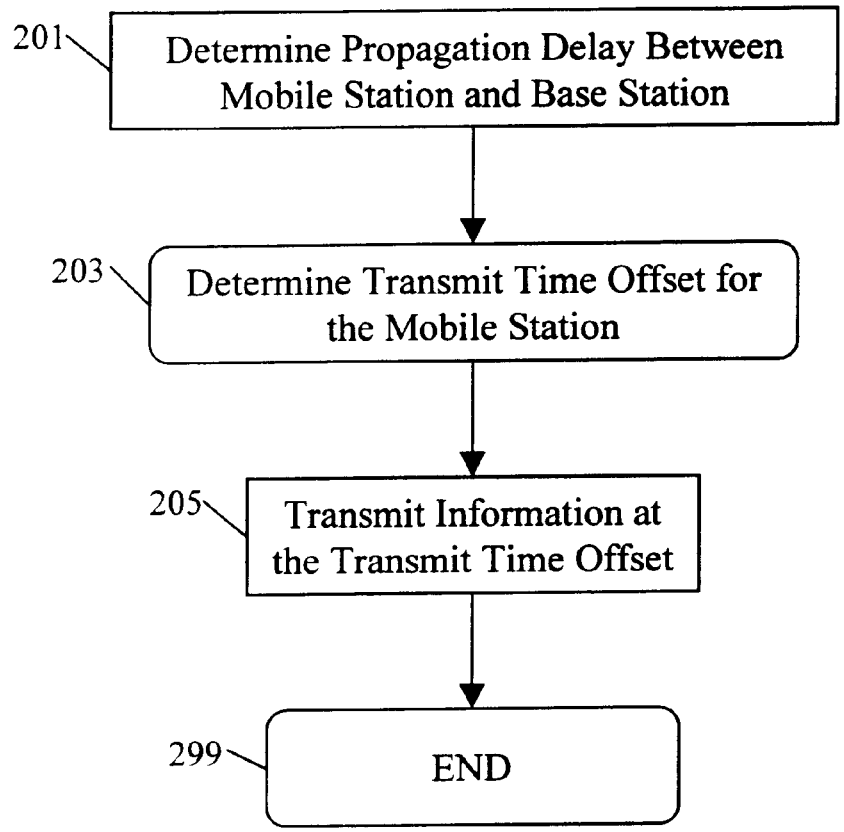
FIG. 2 depicts a flow chart depicting the preferred method for extending the cell radius between a mobile station and a base transceiver station in accordance with the preferred embodiment of the present invention.

The following is a list of the acronyms used in FIGS. 1 and 2:

| | |
|---|---|
| BTS | Base Transceiver Station |
| GPS | Global Positioning System |
| MS | Mobile Station |

Communication system 100 is preferably a Code Division Multiple Access (CDMA) system, but can alternately be Time Division Multiple Access (TDMA) or any system in which critical propagation windows are present. In such systems, mobile stations that are outside of the intended propagation delay are not detected by a base transceiver station. This is primarily a problem during call setup, before system timing is exchanged between the mobile station and the base transceiver station.

Communication system 100 includes a mobile station 101 and a base transceiver station 103. In the preferred embodiment of the present invention, communication system 100 includes multiple base transceiver stations and multiple mobile stations, but only one of each is depicted for clarity.

BTS 103 is preferably connected to a base station controller (BSC), which in turn is connected to a transcoder. The BSC is preferably coupled to a mobile switching center (MSC).

In the preferred embodiment as depicted in FIG. 1, mobile station 101 is preferably a digital cellular telephone, but can alternately be a remote unit, a fixed wireless terminal, or any other unit capable of sending or receiving RF communications to or from BTS 103.

As mobile station 101 moves further from BTS 103, problems can arise with transmissions between MS 101 and BTS 103. To arrive within the search window of the base station, the mobile station decodes the system time presented on the overhead or common broadcast channels. The mobile station aligns its transmission to arrive within the known slot structure at the base transceiver station. The propagation delay accounts for an offset between the aligned mobile transmission and the expected arrival at the base station. CDMA systems include searchers assigned to look for a preamble in a known sequence in their assigned delay space. This space is referred to as the search window, which starts at the beginning of the access slot.

In an alternate embodiment of the present invention, mobile station 101 includes a GPS receiver 109. GPS receiver 109 is effective in determining a system time, which assist mobile station 101 in determining the transmission time from base station 103.

FIG. 2 depicts a flowchart 200 depicting preferred operation of the present invention. Flowchart 200 details a method for extending the cell radius between a mobile station and a base station. The preferred method comprises determining (201) a propagation delay between the mobile station and the base station.

A transmit time offset is determined (203) for the mobile station. The transmit time offset is preferably based at least in part upon the propagation delay. In the preferred embodiment of the present invention, the step of determining a transmit time offset for the mobile station is done at the mobile station.

Figure 3:
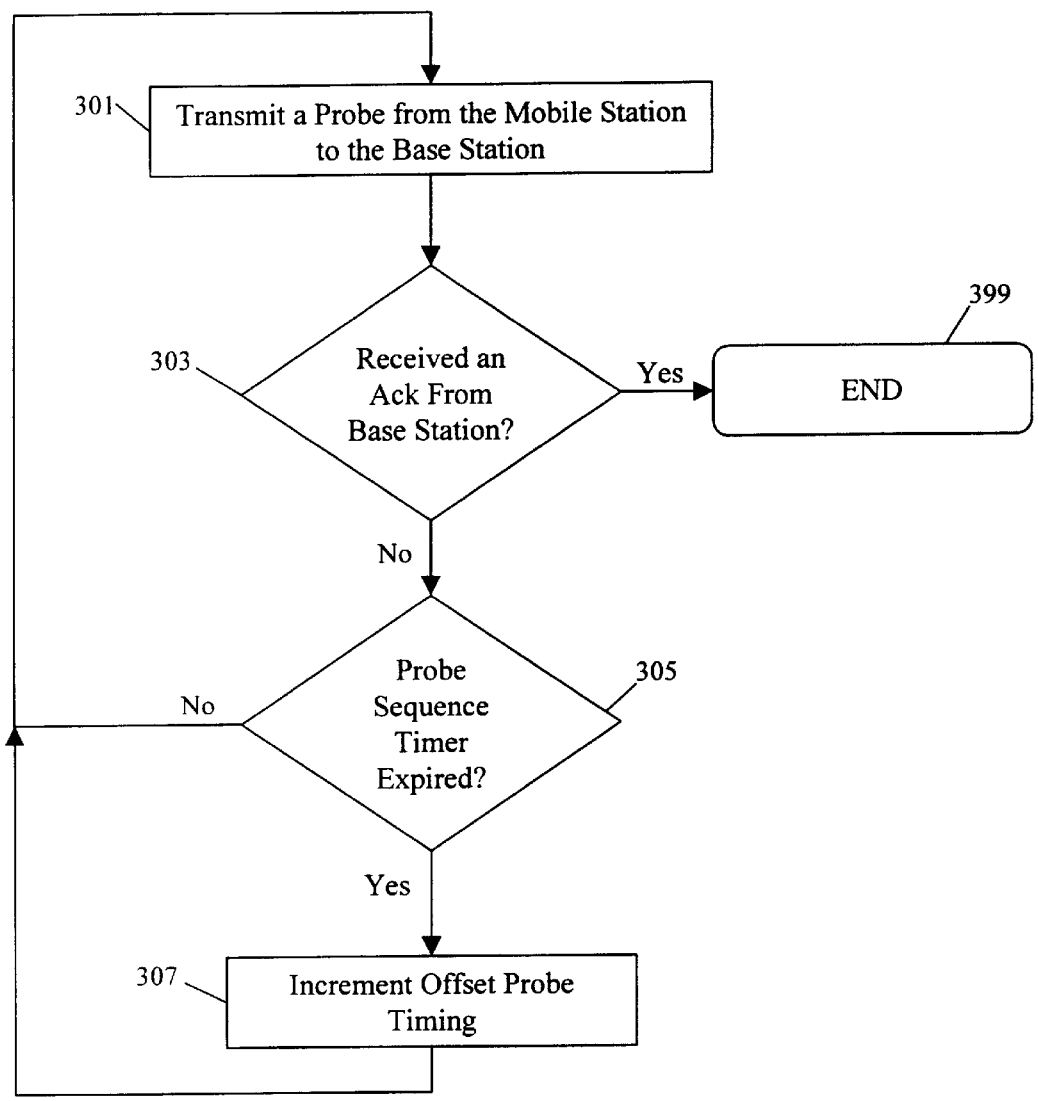
FIG. 3 depicts a flow chart depicting the preferred method of determining the transmit time offset for a mobile station in accordance with the preferred embodiment of the present invention.

FIG. 3 depicts a preferred method 203 for determining the transmit time offset for the mobile station. The mobile station transmits (301) a probe from the mobile station to the base station. The probe is preferably an origination message, but can alternately be a paging response message or any message sent on the access channel. The access channel is preferably the shared reverse link channel, in which all of the messages include a preamble portion and a data portion. The messages can arrive at any time within the search window due to radio channel propagation delay.

The mobile station then determines (303) if it has received an acknowledgement from the base station. If the mobile station has received an acknowledgement, the process ends (399) and returns to step 205 in FIG. 2.

If the mobile station has not received an acknowledgement from the base station, the mobile station determines (305) if a probe sequence timer has expired. If the timer has not expired, i.e. the timer is still active, the process returns to step 301, and the mobile station will continue to transmit probes, preferably at the current delay offset. If the timer has expired, the mobile station increments (307) the offset probe timing. The process then returns to step 301, and the next set of probes transmitted from the mobile station will be advanced with respect to the prior set of probes transmitted.

This process continues until an acknowledgment has been received at the mobile station from the base station. The mobile station preferably stores the BS acknowledgement, which allows for a reduction in the search for the correct time offset in later transmissions.

In the preferred embodiment, the step of continuing to transmit the probe comprises the step of setting a timer at the mobile station. If the timer expires, the mobile station applies a predetermined offset at the mobile station. The mobile station then retransmits the probe at the predetermined offset. In an alternate embodiment of the present invention, the mobile station stores the last successful response from the base station.

Information is then transmitted (205) between the mobile station and the base station at the transmit time offset.

The preferred embodiment of the present invention thereby permits the transmission of signals between a mobile station and a base station that are located more than 55 km from each other. In the preferred embodiment, the mobile station incrementally offsets a probe sent on an access channel until an acknowledgment from the base station is received. The offset is also preferably used for traffic channel operation.

Figure 4:
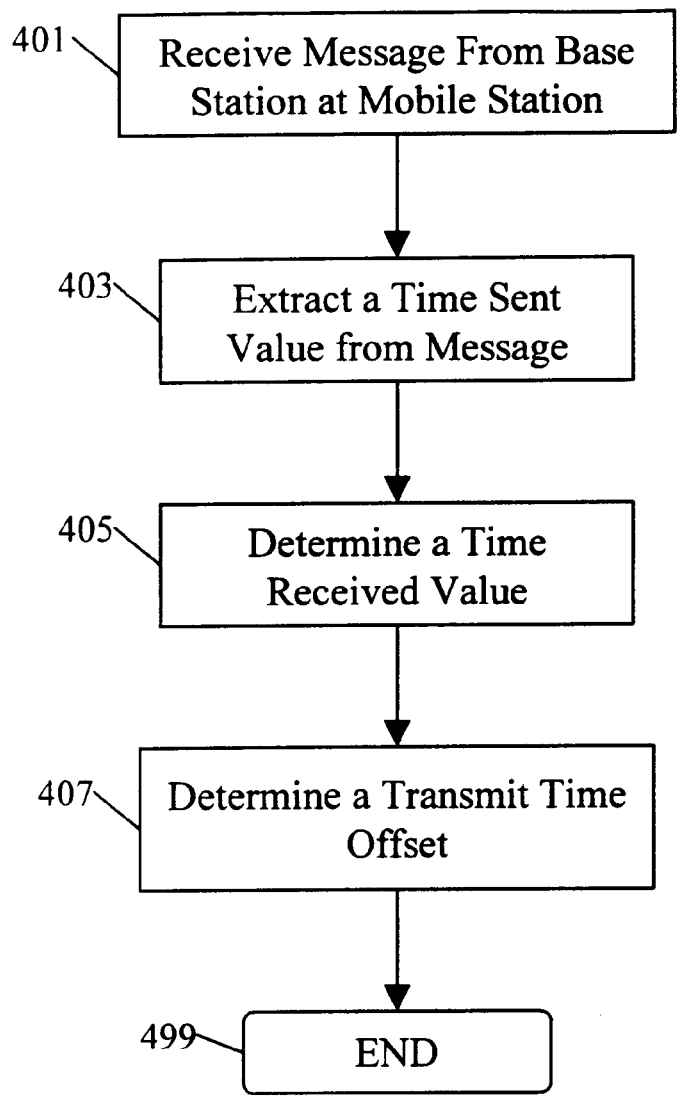
FIG. 4 depicts a flow chart depicting an alternate method for extending the cell radius between a mobile station and a base transceiver station in accordance with an alternate embodiment of the present invention.

FIG. 4 depicts an alternate embodiment 400 for extending the cell radius between a mobile station and a base station. The alternate embodiment depicted in FIG. 4 utilizes a GPS receiver in the mobile station. The GPS receiver can be internally located in the mobile station, or can be externally mounted and connected to the mobile station by an external port.

The mobile station receives (401) a message from the base station. The mobile station preferably acquires a pilot signal from the base station prior to receiving the message.

The mobile station extracts (403) a time sent value from the message. The step of extracting the time sent value from the message preferably comprises receiving a synchronization channel timing message from the base station.

The mobile station then determines (405) a time received value. The time received value is preferably the time that the message was received at the mobile station. The step of determining the time received value preferably comprises comparing the time received value to a known Global Positioning System (GPS) time.

The mobile station then determines (407) a transmit time offset using the time sent value and the time received value. The step of determining the transmit time offset from the message received allows the received window to be determined at the base station. The process then ends (499).

The alternate embodiment of the present invention thereby provides a solution to the 55 km problem by utilizing a GPS receiver in the mobile station. The GPS receiver in the mobile station allows the mobile station to acquire the system time. The mobile station can then calculate the propagation delay from its actual location to the base station and offset its probe by a time that will make the probe visible to the base station.

The present invention therefore provides a method for extending the cell radius between a mobile station and a base station. The present invention provides a solution to a search window limitation of 55 kilometers that is present in current communication systems. The present invention accomplishes this by having the mobile station adjust its timing based at least in part upon subsequent probes, such as access probes or paging response messages. This allows the cell range to be extended to the limit of the path loss or link budget. Each probe is preferably adjusted forward in time to allow the mobile station to determine the cell range.

In an alternate embodiment of the present invention, the 55 kilometer limitation is solved by including a GPS receiver in a mobile station. The mobile station adjusts its timing based at least in part upon an offset between the time value obtained by the GPS receiver and the paging channel timing. This embodiment allows the cell range to be extended to the limit of the path loss or link budget.

The present invention allows cellular operators to provide phone service via either mobile or fixed (Wireless Local Loop). This provides the operators the opportunity to efficiently provide local phone service.

While this invention has been described in terms of certain examples thereof, it is not intended that it be limited to the above description, but rather only to the extent set forth in the claims that follow.

We claim:

1. A method for extending he cell radius between a mobile station and a base station, the method comprising the steps of:

determining a propagation delay between the mobile station and the base station; determining a transmit time offset for the mobile station, the transmit time offset based at least in part upon the propagation delay, wherein the step of determining a transmit time offset for the mobile station comprises the steps of transmitting a probe from the mobile station to the base station and continuing to transmit the probe from the mobile station to the base station until the mobile station receives an acknowledgement message from the base station; and transmitting information between the mobile station and the base station at the transmit time offset.

2. A method for extending the cell radius between a mobile station and a base station in accordance with claim 1, wherein the step of determining a transmit time offset for the mobile station comprises determining a transmit time offset for the mobile station at the mobile station.

3. A method for extending the cell radius between a mobile station and a base station in accordance with claim 1, wherein the step of transmitting a probe comprises the step of transmitting an origination message from the mobile station to the base station.

4. A method for extending the cell radius between a mobile station and a base station in accordance with claim 1, wherein the step of transmitting a probe comprises the step of transmitting a paging response message from the mobile station to the base station.

5. A method for extending the cell radius between a mobile station and a base station in accordance with claim 1, wherein the step of continuing to transmit the probe comprises the steps of:

setting a timer at the mobile station; and if the timer expires:

applying a predetermined offset at the mobile station; and retransmitting the probe at the predetermined offset.

6. A method for extending the cell radius between a mobile station and a base station in accordance with claim 5, further comprising the step of storing the last successful response from the base station.

\* \* \* \* \*